(12) United States Patent
Clark et al.

(10) Patent No.: US 9,114,800 B2
(45) Date of Patent: Aug. 25, 2015

(54) VEHICLE TRANSMISSION WITH CLUTCH PACK OVERRUN

(71) Applicants: Robert David Clark, Vancouver, WA (US); Chenyao Chen, Portland, OR (US); Robert Lee Chess, Troutdale, OR (US)

(72) Inventors: Robert David Clark, Vancouver, WA (US); Chenyao Chen, Portland, OR (US); Robert Lee Chess, Troutdale, OR (US)

(73) Assignee: NACCO Materials Handling Group, Inc., Fairview, OR (US)

( * ) Notice: Subject to any disclaimer, the term of this patent is extended or adjusted under 35 U.S.C. 154(b) by 15 days.

(21) Appl. No.: 14/067,091

(22) Filed: Oct. 30, 2013

(65) Prior Publication Data

US 2014/0052354 A1   Feb. 20, 2014

Related U.S. Application Data

(63) Continuation of application No. 13/202,173, filed as application No. PCT/US2010/025408 on Feb. 25, 2010, now Pat. No. 8,596,156.

(60) Provisional application No. 61/156,042, filed on Feb. 27, 2009.

(51) Int. Cl.
| | |
|---|---|
| F16H 59/36 | (2006.01) |
| B60W 10/11 | (2012.01) |
| F16H 3/10 | (2006.01) |
| F16H 61/684 | (2006.01) |
| B60W 10/02 | (2006.01) |
| F16H 61/02 | (2006.01) |

(52) U.S. Cl.
CPC ............... *B60W 10/11* (2013.01); *B60W 10/02* (2013.01); *F16H 3/10* (2013.01); *F16H 61/684* (2013.01); *F16H 61/0246* (2013.01); *F16H 2200/0039* (2013.01); *Y10T 74/19219* (2015.01); *Y10T 74/19251* (2015.01); *Y10T 477/688* (2015.01); *Y10T 477/755* (2015.01)

(58) Field of Classification Search
USPC .......................... 477/92, 93, 192; 74/325, 335
See application file for complete search history.

(56) References Cited

U.S. PATENT DOCUMENTS

| | | | |
|---|---|---|---|
| 2,389,339 | A | 11/1945 | Ash |
| 2,825,235 | A | 3/1958 | Hindmarch |
| 3,911,760 | A | 10/1975 | Elbers et al. |
| 4,152,952 | A | 5/1979 | Fulmer |
| 4,328,876 | A | 5/1982 | Horsch |

(Continued)

FOREIGN PATENT DOCUMENTS

| | | |
|---|---|---|
| AT | 177322 | 1/1954 |
| CH | 144380 | 3/1931 |

(Continued)

OTHER PUBLICATIONS

European Patent Office; "PCT International Search Report and Written Opinion of the International Searching Authority" for PCT/US2010/025324, filed Feb. 25, 2010; mailed Jun. 16, 2010; 9 pages.

(Continued)

*Primary Examiner* — Ha D Ho

(57) ABSTRACT

A drive system (14, 34) comprising an input shaft (112); a first clutch (114) configured to selectively couple a first gear (116) to the input shaft (112); an output shaft (126); a second gear (138) engaging with the first gear (116); and a drive axle clutch system (142) having different travel direction clutches.

10 Claims, 9 Drawing Sheets

(56) References Cited

U.S. PATENT DOCUMENTS

| | | | |
|---|---|---|---|
| 4,385,528 A | 5/1983 | Pauwels | |
| 4,495,838 A | 1/1985 | Gooch | |
| 4,635,495 A | 1/1987 | White | |
| 4,648,289 A * | 3/1987 | Kubo et al. | 477/93 |
| 4,702,358 A | 10/1987 | Mueller et al. | |
| 4,754,824 A | 7/1988 | Olsson | |
| 4,843,907 A | 7/1989 | Hagin et al. | |
| 4,864,881 A | 9/1989 | Beeson et al. | |
| 4,989,703 A | 2/1991 | Forsyth et al. | |
| 5,050,939 A | 9/1991 | Middelhoven et al. | |
| 5,112,113 A | 5/1992 | Wagner et al. | |
| 5,238,298 A | 8/1993 | Wagner et al. | |
| 5,522,779 A * | 6/1996 | Tabata et al. | 477/126 |
| 5,558,590 A | 9/1996 | Okada et al. | |
| 5,692,990 A * | 12/1997 | Tsukamoto et al. | 477/93 |
| 5,935,041 A * | 8/1999 | Tsukamoto et al. | 477/92 |
| 6,186,029 B1 | 2/2001 | McQuinn | |
| 6,206,798 B1 | 3/2001 | Johnson | |
| 6,254,193 B1 | 7/2001 | Bowman et al. | |
| 6,267,188 B1 | 7/2001 | Bowman et al. | |
| 6,298,932 B1 | 10/2001 | Bowman et al. | |
| 6,345,868 B1 | 2/2002 | Bowman et al. | |
| 6,419,325 B1 | 7/2002 | Bowman et al. | |
| 6,471,301 B1 | 10/2002 | Johnson | |
| 6,527,073 B1 | 3/2003 | Bowman et al. | |
| 6,672,985 B2 | 1/2004 | Chung et al. | |
| 6,684,148 B2 | 1/2004 | Chess | |
| 6,890,039 B2 | 5/2005 | Chung | |
| 6,984,190 B2 * | 1/2006 | Legner | 477/53 |
| 7,090,608 B2 | 8/2006 | Han | |
| 7,383,910 B2 | 6/2008 | Mori et al. | |
| 8,596,156 B2 | 12/2013 | Clark et al. | |
| 8,651,205 B2 | 2/2014 | Chess et al. | |
| 2008/0314701 A1 | 12/2008 | Bogelein et al. | |
| 2011/0297460 A1 | 12/2011 | Chess et al. | |
| 2011/0303505 A1 | 12/2011 | Clark et al. | |

FOREIGN PATENT DOCUMENTS

| | | |
|---|---|---|
| EP | 0025716 | 3/1981 |
| EP | 1342591 | 9/2003 |
| EP | 1288054 | 5/2006 |
| EP | 2401188 | 1/2012 |
| JP | 6239264 | 8/1994 |
| JP | 2003159903 | 6/2003 |
| WO | 2010099267 | 9/2010 |
| WO | 2010099315 | 9/2010 |

OTHER PUBLICATIONS

European Patent Office; "PCT International Search Report and Written Opinion of the International Searching Authority" for PCT/US2010/025408, filed Feb. 25, 2010; mailed Jul. 13, 2010; 16 pages.

* cited by examiner

VEHICLE TRANSMISSION WITH CLUTCH PACK OVERRUN

RELATED APPLICATIONS

This application claims priority to U.S. Provisional Patent Application Ser. No. 61/156,042 filed on Feb. 27, 2009, to PCT application Ser. No. PCT/US10/25408 filed on Feb. 25, 2010, and to co-pending U.S. patent application Ser. No. 13/202,173 (published as U.S. Pat. Pub. No. 2011/0303505 A1 on Dec. 15, 2011) which are all herein incorporated by reference in their entirety.

BACKGROUND

A torque converter is used for transferring rotating power from a prime mover, such as an internal combustion engine or electric motor, to a rotating driven load, such as a vehicle Like a basic fluid coupling, the torque converter normally takes the place of a mechanical clutch, allowing the load to be separated from the power source.

The torque converter has three stages of operation. During a stall stage, the engine is applying power to a torque converter pump but a torque converter turbine cannot rotate. For example, in an automobile, this would occur when the driver has placed the transmission in gear but prevents the vehicle from moving by continuing to apply the brakes. During an acceleration stage, the vehicle is accelerating but there still is a relatively large difference between pump and turbine speed. During a coupling stage when the vehicle is moving, the turbine reaches a larger percent of the speed of the pump.

The torque converter is used for smoothing the engagement of the engine to the drive train. However, torque converters are generally inefficient and much of the wasted energy is expended in the form of heat. For example, there is zero efficiency during the stall stage, efficiency generally increases during the acceleration phase, and it is still moderately inefficient during the—coupling stage.

SUMMARY

A multi-speed transmission system replaces a torque converter by controlled clutch slipping. The multi-speed transmission is also designed to replace the torque amplification normally provided by torque converters at low speeds. The transmission system uses one-way bearings that provide smooth transitions between gears and significantly improve the efficiency of the transmission to the equivalent of a manual transmission while eliminating the drag normally associated with hydraulic clutch packs.

DETAILED DESCRIPTION

Figure 1:
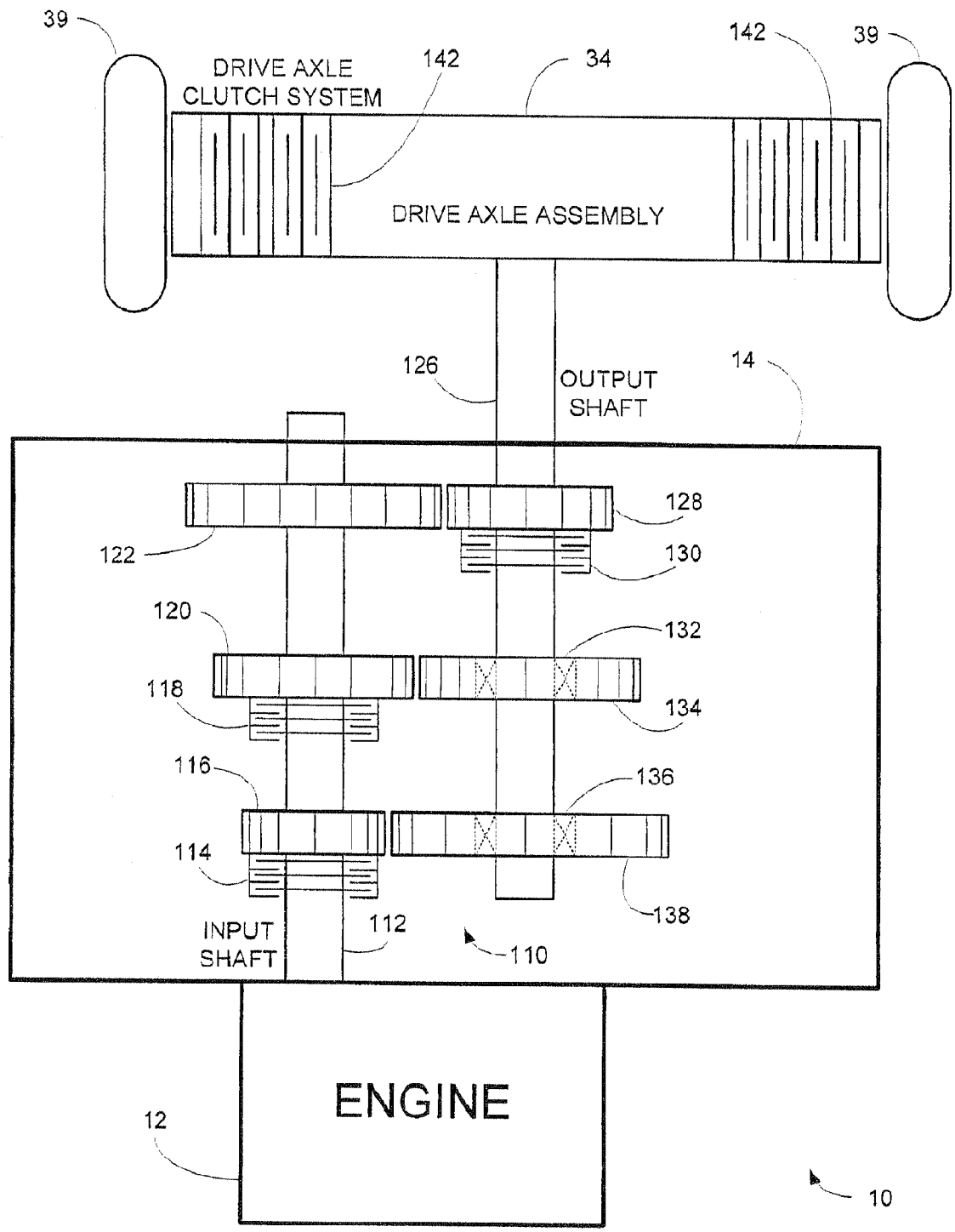
FIG. 1 is a schematic diagram of a multi-speed transmission system.

FIG. 1 is a schematic of a portion of a vehicle 10 that includes a multi-speed transmission system 14. The transmission system 14 uses a clutch pack overrun system 110 that eliminates some of the inefficiencies associated with torque converters. The vehicle 10 in one embodiment is an industrial lift truck. However, the transmission system 14 can be used in a variety of different vehicles.

The vehicle 10 includes an engine 12 that is connected to a drive axle assembly 34 through the transmission system 14. The engine 12 rotates an input shaft 112 that then through clutch pack overrun system 110 selectively applies torque and rotates an output shaft 126. The output shaft 126 couples the transmission system 14 with the drive axle assembly 34 and causes the drive axle assembly 34 to rotate wheels 39.

One embodiment of the drive axle assembly 34 is conventional. In another embodiment, the drive axle assembly 34 uses a drive axle clutch system 142 that includes different travel direction hydraulic clutches and gears to rotate wheels 39 in different directions and move the vehicle 10 in different forward, reverse, and turning directions. The drive axle clutch system 142 is described in U.S. Provisional Patent Application Ser. No. 61/156,042 filed on Feb. 27, 2009, and U.S. patent application Ser. No. 13/202,165 which have both been incorporated by reference in their entirety.

It should be understood that the transmission system 14 can operate with any conventional axle assembly and vehicle direction control system. The transmission system 14 is not required to be used in conjunction with the drive axle clutch system 142 described above, and can operate independently of the drive axle clutch system 142. However, at least one embodiment below describes how the transmission system 14 operates in conjunction with drive axle clutch system 142.

The transmission system 14 includes a first drive gear 116 selectively connected to the input shaft 112 through a first hydraulic clutch pack 114. A second drive gear 120 is selectively connected to the input shaft 112 through a second hydraulic clutch pack 118 and a third drive gear 122 is rigidly connected to the input shaft 112.

A first driven gear 138 engages with first drive gear 116 and engages with the output shaft 126 through a first one-way bearing 136. A second driven gear 134 engages with a second drive gear 120 and is engaged with the output shaft 126 through a second one-way bearing 132. A third driven gear 128 engages with a third drive gear 122 and is selectively connected to the output shaft 126 by a third hydraulic clutch pack 130.

Hydraulic clutches 114, 118, and 130 operate similar to hydro-mechanical clutches in power shift transmissions. The hydraulic clutches 114 and 118 can selectively lock the gears 116 and 120, respectively, to the input shaft 112 when rotating. The hydraulic clutch 130 can selectively lock the gear 128 to the output shaft 126. Each hydraulic clutch is provided with a proportional electro-hydraulic valve and hydraulic pressure sensor to provide for control and feedback (see FIG. 4). Alternative sensors, such as torque sensors can be used in place of pressure sensors for closed feedback loop control.

Torque is transferred from input shaft 112 to output shaft 126 when first hydraulic clutch 114 locks first drive gear 116 to input shaft 112 and first one-way bearing 136 locks first driven gear 138 to output shaft 126. Torque is also transferred from input shaft 112 to output shaft 126 when second hydraulic clutch 118 locks second drive gear 120 to input shaft 112 and second one-way bearing 132 locks second driven gear 134 to output shaft 126. Torque is also transferred from input shaft 112 to output shaft 126 when third hydraulic clutch 130 locks third driven gear 128 to output shaft 126.

The one-way bearings 136 and 132 lock the gears 138 and 134, respectively, to the output shaft 126 when turning in only one direction of shaft rotation. The one-way bearings 136 and 132 allow the output shaft 126 to free wheel inside the driven gears 138 and 134, respectively, if the output shaft 126 turns faster than the driven gear.

Figure 2:
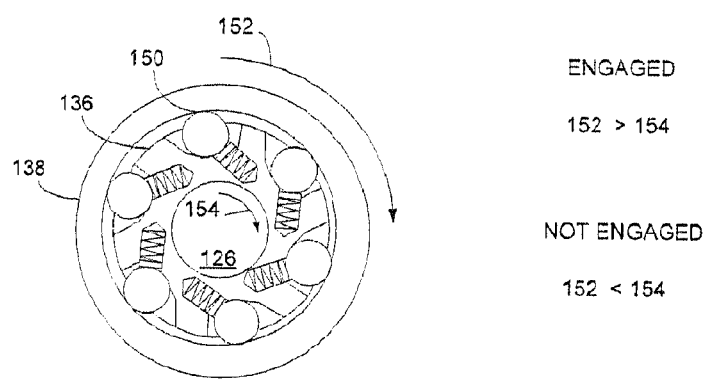
FIG. 2 is a schematic cut-away view of a one-way bearing used in the transmission system of FIG. 1.

FIG. 2 is a simplified sectional view showing some of the elements in one of the one-way bearings 136 or 132. FIG. 2 uses first one-way bearing 136 as an example. The first one-way bearing 136 is coupled to the output shaft 126 and includes bearings 150 that press against an inside wall of the driven gear 138.

When the first driven gear 138 has a rotational speed 152 that is faster than the rotational speed 154 of output shaft 126, the first one-way bearing 136 automatically locks the first driven gear 138 to the output shaft 126. The first one-way bearing 136 automatically releases the first driven gear 138 from the output shaft 126 when the output shaft 126 starts rotating at a faster rotational speed 152 than the first driven gear 138. This unlocked one-way bearing state is alternatively referred to as free-wheeling.

When the first driven gear 138 is overrun by the output shaft 126, the first drive gear 116 in FIG. 1 cannot transfer torque from the input shaft 112 to the output shaft 126. There is also very low drag when the first one-way bearing 136 is in the unlocked free-wheeling state. The one-way bearing is used to accomplish an up or down shift. Again, it should be noted that FIG. 2 is a simplified representation of a one-way bearing, and other one-way bearing configurations can also be used in transmission system 14.

Figure 3A:
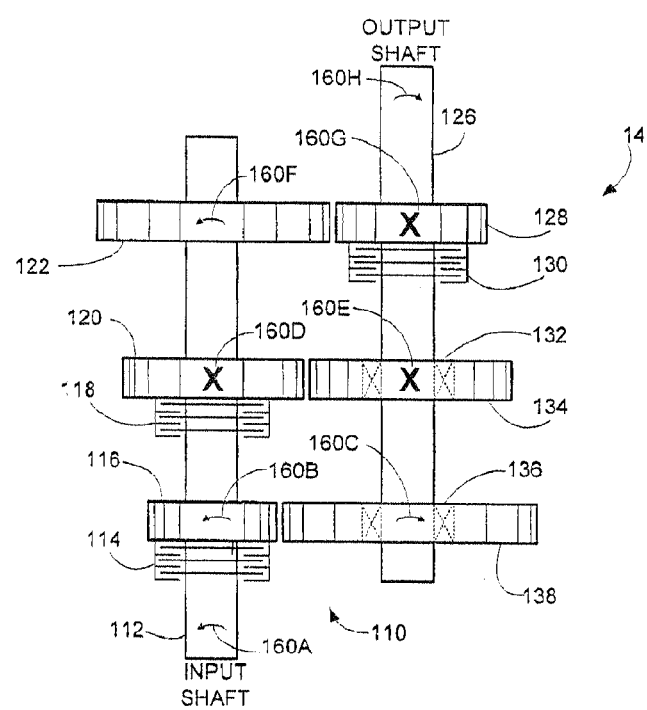
FIG. 3A-3C are isolated views of a portion of the transmission system shown in FIG. 1.
Figure 3B:
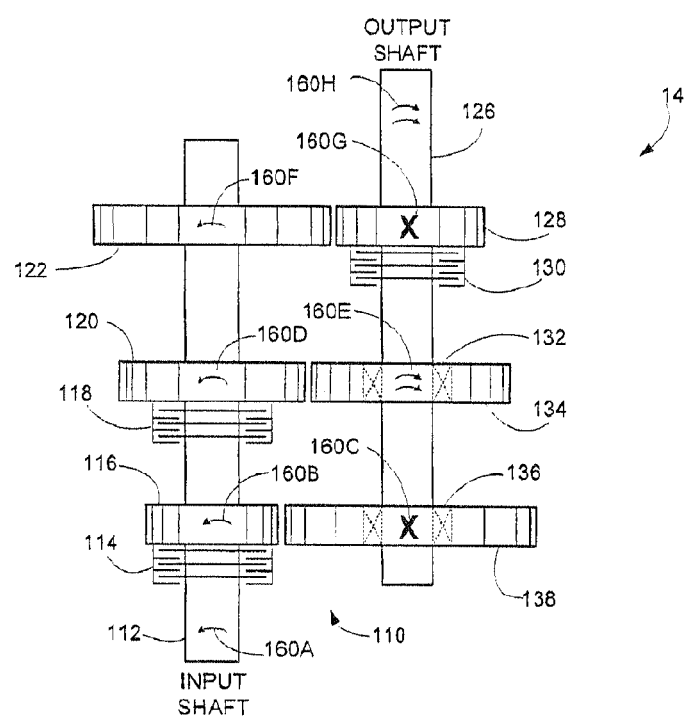
Figure 3C:
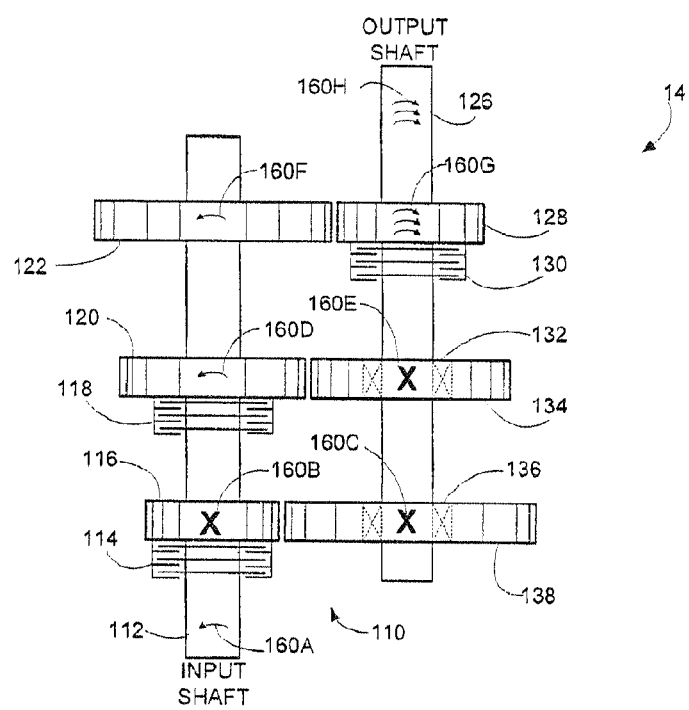

FIGS. 3A-3C describe in more detail how the transmission system 14 operates. The rotational states 160A-160H refer to different rotational states of the shafts 112 and 126 and different rotational or locking states of the one-way bearings and hydraulic clutches.

Referring first to FIG. 3A, the hydraulic clutch 114 is activated and hydraulic clutches 118 and 130 are deactivated. Plates in the first hydraulic clutch 114 press together in the active state, coupling the first driven gear 116 to the input shaft 112. Activating first hydraulic clutch 114 causes a rotation 160B in first drive gear 116. Depending on the current state of the vehicle 10 either in a stopped or moving condition, the first hydraulic clutch 114 may be slipped to gradually engage the input shaft 112 with first drive gear 116 or the first hydraulic clutch 114 may be locked.

The first drive gear 116 has a relatively low rotational speed 160B, creating a rotational speed 160C in first driven gear 138. However, output shaft 126 is currently not rotating and the faster rotation 160C of first driven gear 138 causes the first one-way bearing 136 to lock first driven gear 138 to output shaft 126. The locking of first one-way bearing 136 allows the first drive gear 116 to apply torque to the output shaft 126 and start output shaft 126 rotating with a rotational speed 160H.

The second hydraulic clutch 118 is currently not activated, so the second drive gear 120 is unlocked and has no rotational speed 160D and the second driven gear 134 is unlocked and has no rotational speed 160E. Since the output shaft 126 is rotating faster than stationary second driven gear 134, the second one-way bearing 132 does not engage and the output shaft 126 freewheels inside of the second driven gear 134. In this stage, the second drive gear 120 does not apply any torque to the output shaft 126.

The third drive gear 122 is permanently attached to the input shaft 112 and has a rotational speed 160F and limited torque that rotates the third driven gear 128. However, the third hydraulic clutch 130 is currently not activated and therefore the third drive gear 122 also does not apply torque to the output shaft 126.

The high gear ratio of driven gear 138 to drive gear 116 provides high torque to the output shaft 126 for pushing. The first hydraulic clutch 114 can also be used as an inching clutch for starting and fine positioning. However, any of the other clutches may be also used for inching control.

FIG. 3B shows how the transmission system 14 operates during a transition from first drive gear 116 to the second drive gear 120. The second hydraulic clutch 118 is activated causing input shaft 112 to rotate second drive gear 120 with rotational speed 160D. In this example, the first hydraulic clutch 114 is shown still activated and the third hydraulic clutch 130 is still not activated. However, the first hydraulic clutch 114 may be released sometime after the second hydraulic clutch 118 is activated.

The second drive gear 120 rotates the second driven gear 134 faster than the first drive gear 116 rotates the first driven gear 138 and output shaft 126. Accordingly, the second one-way bearing 132 locks the second driven gear 134 to output shaft 126 and the second drive gear 120 starts applying torque and a rotational speed 160H to the output shaft 126. Output shaft 126 is now rotating faster than the first driven gear 138 causing the first one-way bearing 136 to release the first driven gear 138 from output shaft 128. Output shaft 128 then starts free-wheeling inside of the first driven gear 138 and the first drive gear 116 no longer applies torque to the output shaft 126. The third hydraulic clutch 130 is still deactivated and the third drive gear 122 still does not apply torque to the output shaft 126.

One advantage of the transmission system 14 is the simple relatively smooth transitions between different gears. For example, the first one-way bearing 136 automatically disengages when the second one-way bearing 132 engages. Thus, the disengagement of the first hydraulic clutch 114 does not have to be precisely coordinated with the engagement of the second hydraulic clutch 118. The use of a high gear ratio with gears 116 and 138 also eliminates the need for a torque converter. The engine 12 (FIG. 1) also does not need to be revved up as high to prevent stalling when transitioning to lower gear ratios.

FIG. 3C shows how the transmission system 14 operates during another transition from second drive gear 120 to the third drive gear 122. The third hydraulic clutch 130 is activated locking the third driven gear 128 to output shaft 126. The third drive gear 122 has a rotational speed 160F and applies torque and rotates the output shaft 126. In this example, the second hydraulic clutch 118 is shown still activated and first hydraulic clutch 114 is shown deactivated. However, any combination of the hydraulic clutches 114 and 118 may be released or not released after hydraulic clutch 130 is activated. For example, it is possible for all three hydraulic clutches to be engaged without gears binding.

The third drive gear 122 generates a rotational speed 160G in the third driven gear 128 which in turn creates a rotational speed 160H in the output shaft 126. In this embodiment the gear ratio between the third driven gear 128 and the third drive gear 122 is lower than the gear ratio between the second driven gear 134 and the second drive gear 120. The gear ratio between the second driven gear 134 and the second drive gear 120 is lower than the gear ratio between the first driven gear 138 and the first drive gear 116. Thus, the rotational speed 160H will be faster than both the rotational speed of the first driven gear 138 and faster than the rotational speed of the second driven gear 134. Accordingly, the second one-way bearing 132 disengages the second driven gear 134 from output shaft 126 and the first one-way bearing 136 keeps the first driven gear 138 disengaged from output shaft 126. Thus, the transmission system 14 moves into third drive gear 122 without having to mechanically coordinate the disengagement of the other gears 116 and 120.

A reverse process is used to downshift from the drive gear 122 back down to gears 120 or 116. Conventional transmission systems have to simultaneously modulate both the deactivation of one gear clutch and the activation of another gear clutch requiring a high degree of coordination to achieve smooth shifting. However, in the transmission system 14, different hydraulic clutches can remain engaged during upshifting and downshifting operations because of the overrunning capability of the associated one-way bearings. As the transmission system 14 shifts, one gear starts to transmit torque and stops overrunning as another gear is disengaged.

For example, the second hydraulic clutch 118 can be engaged while the third hydraulic clutch 130 is disengaged. This allows the second drive gear 120 to eventually start rotating the second driven gear 134 faster than the output shaft 126. The second one-way bearing 132 then engages the second driven gear 134 with the output shaft 126 and allows the second drive gear 120 to start applying torque to the output shaft 126.

Similarly, the first hydraulic clutch 114 can be engaged while the second hydraulic clutch 118 is disengaged. The first one-way bearing 136 locks the first driven gear 138 with output shaft 126 when the rotational speed of the first driven gear 138 overtakes the rotational speed of output shaft 126. The first drive gear 116 then starts applying torque to the output shaft 126.

There is a relatively smooth transition from the third drive gear 122 to the second drive gear 120 and from the second drive gear 120 to the first drive gear 116. This is due to the one-way bearings 132 and 136 only locking the output shaft 126 with driven gears 134 and 138, respectively, when the speed of the driven gears overtake the rotational speed of output shaft 126. Thus, the vehicle jerking that normally occurs in conventional transmission systems when transitioning between gears may be reduced.

During "free wheeling" when going down a grade in first drive gear 116, the output shaft 126 may overrun the first driven gear 138. One control strategy is to shift to third drive gear 122 and let third driven gear 128 provide some degree of engine braking. The clutch system 142 located in the drive axle assembly 34 in FIG. 1 can also be used for braking the vehicle 10.

Control System

Figure 4:
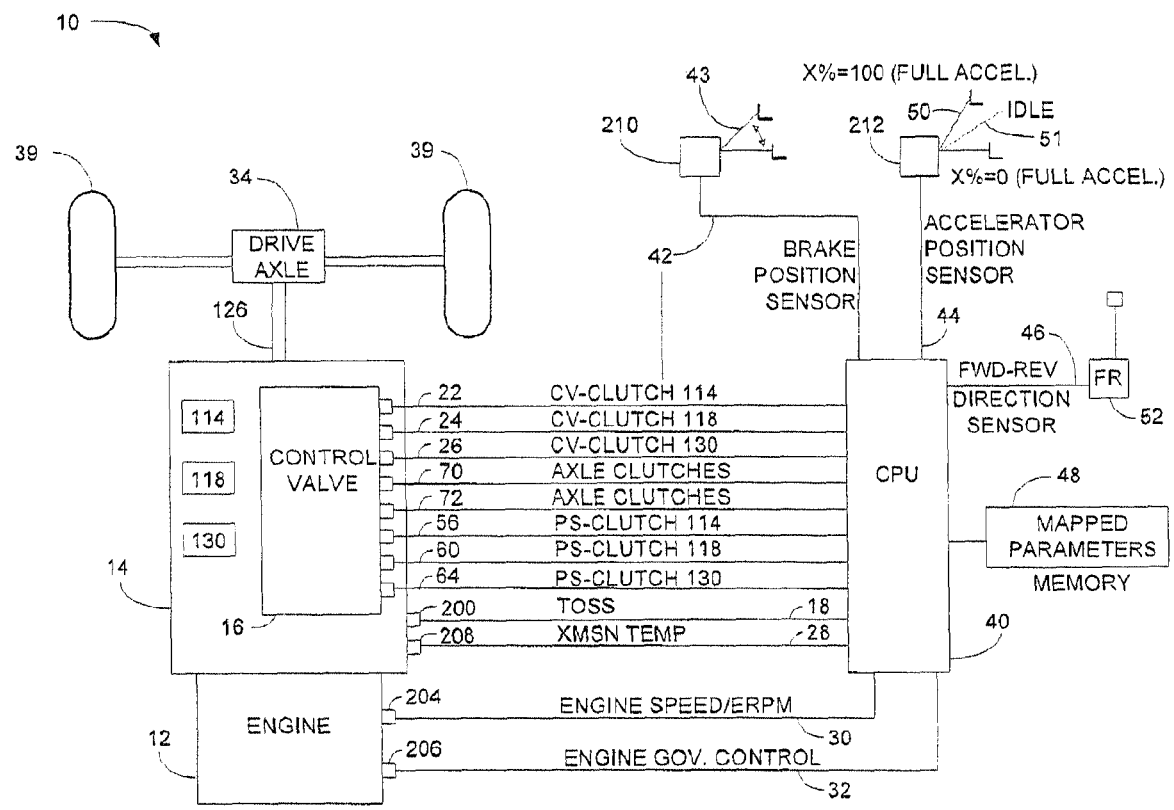
FIG. 4 is a block diagram of a control system used in conjunction with the transmission system of FIG. 1.

FIG. 4 shows a control system for the vehicle 10 and transmission system 14 previously shown in FIGS. 1-3C. A Central Processing Unit (CPU) 40 controls the activation of hydraulic clutch packs 114, 118, and 130 in the transmission system 14 according to different vehicle parameters. A control valve 16 in the transmission 14 controls fluid pressure that controls the activation of the clutch packs 114, 118, and 130.

The CPU 40 receives a vehicle speed and direction signal 18 from a vehicle speed sensor 200 that indicates the Transmission Output Shaft rotational Speed (TOSS) and direction of the output shaft 126. An Engine Rotations Per Minute (ERPM) signal 30 is generated from an engine speed sensor 204 and indicates how fast the input shaft 112 (FIG. 1) connected to the engine 12 is rotating. An engine governor control signal 32 controls a throttle valve 206 that controls the speed of engine 12. A transmission temperature signal 28 is generated by a temperature sensor 208 and identifies the temperature of the transmission fluid in the transmission 14.

The CPU 40 receives a brake pedal position signal 42 from a brake pedal position sensor 210 on brake pedal 43. An accelerator pedal position signal 44 is received from an accelerator pedal position sensor 212 on accelerator pedal 50. The accelerator pedal position can alternatively correspond to a throttle value, acceleration value, or deceleration value.

A forward-reverse direction signal 46 is generated by a direction lever or pedal 52 and indicates a forward or backward direction the vehicle operator selects for the vehicle 10. An internal or external memory 48 contains mapped parameters identifying clutch pressure values and other control and speed parameters used for performing different braking and shifting operations. Some of the parameters stored in memory 48 are described in more detail below in FIGS. 5-7.

The hydraulic clutches 114, 118, and 130, in combination with one-way bearings 136 and 132 selectively engage and disengage the input shaft 112 with the output shaft 126 as described above. The engaging force of the hydraulic clutches 114, 118, and 130 are controlled by changing the oil pressure in the clutch chambers. The oil pressure in the clutch chambers is controlled by the control value 16 which is controlled by the CPU 40.

Control valve clutch signal 22 controls the oil pressure in the first hydraulic clutch pack 114, control valve signal 24 controls the oil pressure in the second hydraulic clutch pack 118, and control valve signal 26 controls the oil pressure in the third hydraulic clutch pack 130. Where the drive axle clutch system 142 in FIG. 1 is used, one or more signals 70 control the oil pressure(s) for the clutch system 142 (FIG. 1) in the drive axle assembly 34.

Pressure sensor signal 56 indicates the amount of pressure applied by the control valve 16 in the hydraulic clutch pack 114. Pressure sensor signal 60 indicates the amount of pressure applied in the hydraulic clutch pack 118 and pressure sensor signal 64 indicates the amount of pressure applied by the control valve 16 to the hydraulic clutch pack 130. When hydraulic clutch packs are used in the drive axle 34, one or more pressure sensor signals 72 indicate the amount of pressure applied to the hydraulic clutch packs 142. When a conventional drive axle is used, pressure sensor signal 72 is not used.

The CPU 40 uses the signals 56, 60, and 64 to determine the amount of slipping in the hydraulic clutch packs 114, 118, and 130, respectively. When any of the clutch pressures are zero, the particular hydraulic clutch 114, 118, or 130 disengages that associated gear from the input shaft 112 or output shaft 126. When the clutch pressure for any of the hydraulic clutch packs is at a maximum pressure, the corresponding clutch pack maximizes the engaging force between the associated shaft and gear (locking). When the clutch pack pressure is between zero and the maximum value, the corresponding clutch pack is partially engaged. The partially engaged condition is referred to as "clutch pack slipping."

As mentioned above, the drive axle 34 can be a conventional drive axle that does not use hydraulic clutch packs. However, when located in the drive axle assembly 34, the clutch system 142 permits the application of torque from the engine 12 to be separated from clutch pack braking. This permits engine speed control independent of ground speed. For example, an operator may wish to speed up the engine 12 for hydraulic operations while decreasing the vehicle travel speed. This can be performed automatically by having the CPU 40 disengage the transmission 14 and apply clutch pack braking in the drive axle assembly 34.

Figure 5:
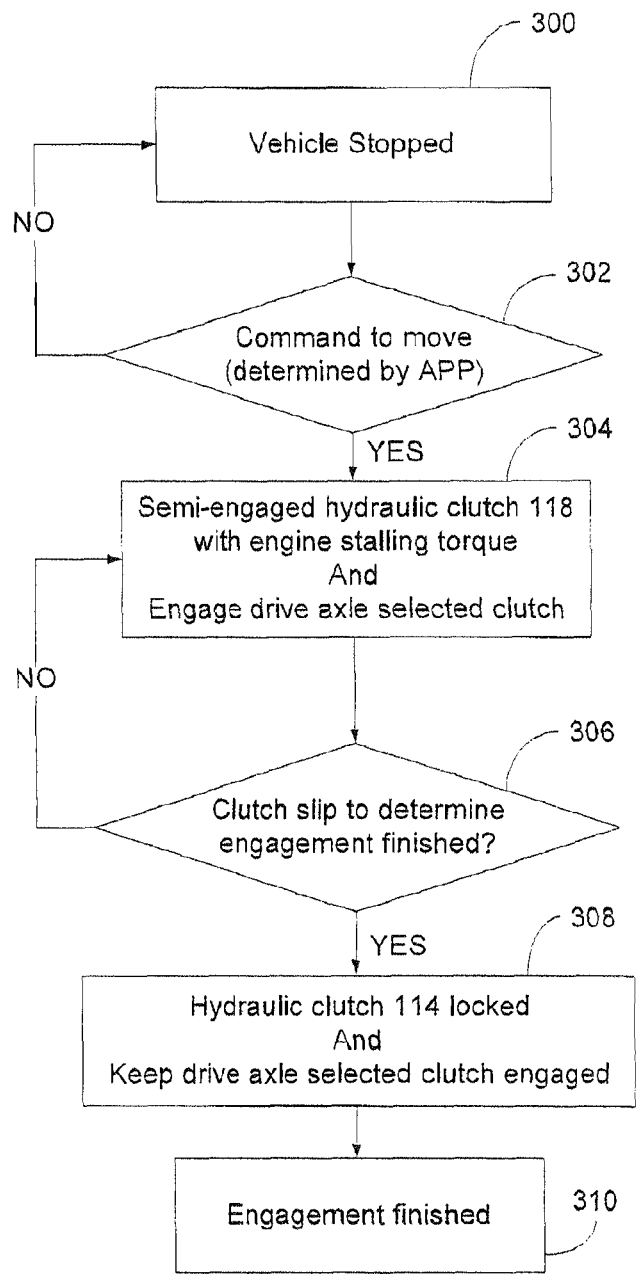
FIG. 5 is a flow diagram showing in more detail how the transmission system in FIG. 1 operates when the vehicle is in a stopped position.

FIG. 5 is a flow diagram describing one way the control system in FIG. 4 operates when the vehicle 10 is stopped in state 300. In operation 302, the CPU 40 receives a command to move the vehicle 10. For example, the CPU 40 may receive the accelerator pedal position signal 44 responsive to the Accelerator Pedal Position (APP) of accelerator pedal 50. In operation 304, the first hydraulic clutch 114 is slipped by the CPU 40 by controlling the amount of pressure supplied by control valve 16 via signal 22. The slipping of the first hydraulic clutch 114 limits torque, preventing engine 12 from stalling, and reduces drive gear engagement shock to the drive axle assembly 34 and the vehicle operator. This clutch pack slipping replaces at least one of the functions of a torque converter, namely preventing the engine 12 from stalling when the vehicle 10 starts moving from a stopped position.

Selected clutches in clutch system 142 when used in the drive axle 34 are also engaged in operation 304 according to the selected travel direction and slope of the vehicle 10. For example, a first set of clutches in clutch system 142 may be selected for engagement by CPU 40 via signals 70 to move the vehicle 10 in a forward direction and a second set of clutches in clutch system 142 may be selected for engagement by the CPU 40 to move the vehicle 10 in the reverse direction. The direction of the vehicle 10 may be determined by the CPU 40 via the direction sensor signal 46.

In operation 306, the CPU 40 continues to increase the pressure supplied by control valve 16 to the first hydraulic clutch 114 and correspondingly increases the amount of torque supplied by the engine 12 to the drive axle 34 according to operator intent. For example, the CPU 40 continuously monitors the position of accelerator pedal 50 to determine how much pressure and associated slipping to apply in the first hydraulic clutch pack 114 using signal 22 and to determine what speed to run engine 12 using signal 32.

The CPU 40 in operations 304 and 306 continues to increase pressure until engagement of the first hydraulic clutch 114 is finished. For example, when the operator stops depressing accelerator pedal 50, the CPU 40 may determine that the first hydraulic clutch 114 has the correct amount of slippage and the engine 12 is providing the correct amount of torque to drive axle 34.

The CPU 40 may continue to increase pressure to the first hydraulic clutch 114 in operations 304 and 306 until the first hydraulic clutch 114 completely locks input shaft 112 to the first driven gear 116 in operation 308 and while the drive axle clutches in clutch system 142 remain engaged. The vehicle 10 is now moving and the start up sequence for the vehicle 10 performed by the CPU 40 is completed in operation 310.

Figure 6:
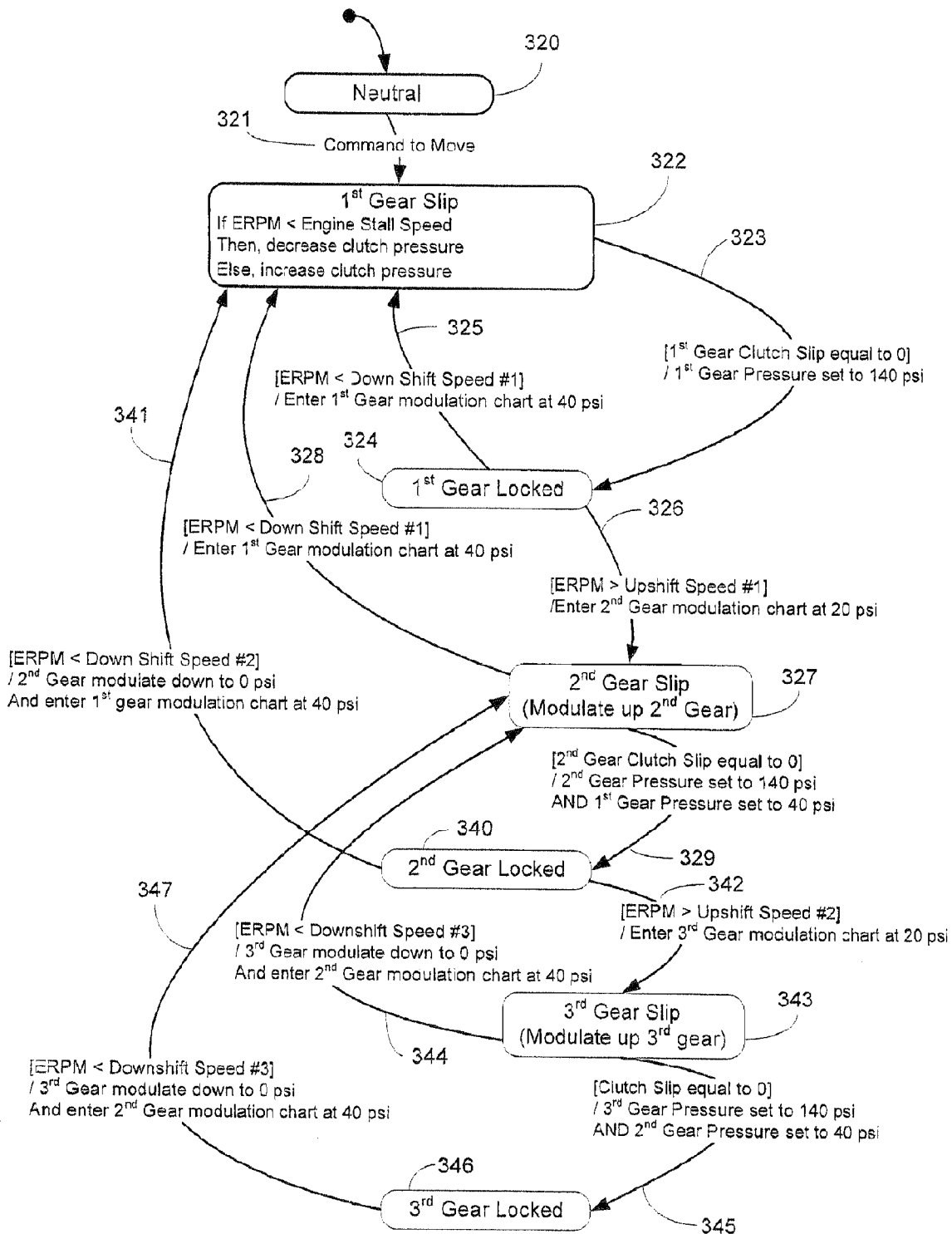
FIG. 6 is a state diagram showing in more detail how the transmission system in FIG. 1 shifts between gears.

FIG. 6 is a state diagram further explaining how the transmission system 14 shifts between different gears. The example described below shows transitions between three different gears. However, more or fewer than three gears can be used in the transmission system 14. Transitions between additional gears would operate similarly to the transitions between the second and third gears as described below. FIG. 6 illustrates normal up and down shifting and also shows how the first gear is torque limited to prevent engine stalling and to prevent overloading the drive axle.

In one embodiment, the operations described in FIG. 6 are controlled by the CPU 40 previously shown in FIG. 4. Example control valve pressures are used in FIG. 6 for illustrative purposes but alternative pressures can be used to provide similar clutch pack modulations. In this example, a 0 pounds per square inch (psi) pressure is associated with a completely unlocked hydraulic clutch. A 20 psi hydraulic clutch pressure is associated with a touch point where the clutch is just starting to transfer torque to the drive axle 34. A 40 psi pressure represents a clutch that is lightly engaged (slipping) and transfers only a partial amount of torque to reduce impact on the vehicle when a one-way bearing is initially engaged. A 140 psi pressure is associated with a fully locked hydraulic clutch.

The CPU 40 can determine from the gear ratios currently being used in the transmission system 14, Engine Rotations Per Minute (ERPM) 30, and Transmission Output Shaft Speed (TOSS) 18 (see FIG. 4) when there is zero slip in a particular hydraulic clutch 114, 118, or 130. Travel downshift speed values and travel upshift speed values as described below are predetermined variables based on accelerator pedal position 44 and ERPM 30.

The vehicle 10 and transmission system 14 are initially in a neutral state 320. A vehicle move command condition 321 moves the transmission system into a first gear slip state 322. The pressure in the first hydraulic clutch 114 is decreased if the ERPM is less than a predetermined engine stall speed. Otherwise, the pressure in the first clutch is increased. Varying the clutch pressure is alternatively referred to as modulation.

When the measured clutch slip in condition 323 is zero, the first clutch 114 is locked by increasing the clutch pressure to 140 psi. The transmission system also moves into a first gear locked state 324. If the ERPMs drop down below a predetermined downshift speed #1 in condition 325, the CPU moves the transmission system back into first gear slip state 322. The CPU uses a first gear modulation chart in memory 48 to determine what pressures to then apply to the first clutch 114. In this example, the CPU starts at 40 psi to reduce the torque on the engine 12 and then varies the clutch pressure according to the accelerator pedal position 44, ERPM 30, and TOSS 18.

Otherwise, the transmission system stays in the first gear locked state 324 until the ERPM rises above a predetermined upshift speed #1 in condition 326. When the ERPM rises above the upshift speed #1 value, the CPU moves the transmission system into second gear slip state 327. In this example, the CPU starts the pressure in the second hydraulic clutch 118 at 20 psi while keeping the first hydraulic clutch 114 in a fully locked condition. While in the second gear slip state 327, the CPU increases or modulates the pressure based on mappings of the accelerator pedal position 44, ERPM 30 and TOSS 18 in the second gear modulation chart.

If the ERPM drops below the down shift speed #1 value in condition 328, the CPU 40 moves the transmission system back into the first gear slip state 322 and the first gear modulation pressure starts at 40 psi in the first gear modulation chart. The clutch pressure is set to 40 psi to quickly move the hydraulic clutch 118 to a beginning initial slipping condition.

While in second gear slip state 327, the CPU continues to increase the pressure in hydraulic clutch 118 until the second clutch 118 has zero slip in condition 329. The pressure is then set to 140 psi to solidly hold the hydraulic clutch 118 in a second gear locked state 340. The pressure in the first hydraulic clutch 114 is also set to 40 psi allowing the transmission system to quickly respond to any downshift back to first gear slip state 322.

In second gear locked state 340, a reduction of the ERPM below a predetermined down shift speed #2 value in condition 341 causes the CPU to move back to first gear slip state 322. The pressure in clutch 118 is reduced down to 0 psi and the first clutch 114 is entered at 40 psi in the first gear modulation chart. The controlled reduction of the pressure in the second clutch 118 down to 0 psi reduces vehicle jolt that could happen if the second gear were instantly disengaged. If the ERPM rises above a predetermined upshift speed #2 in condition 342, the CPU moves the transmission system into a third gear slip state 343 and starts hydraulic clutch 130 at 20 psi in a third gear modulation chart.

The CPU continues to modulate/increase the pressure in the hydraulic clutch 130. If the ERPM drops below a predetermined downshift speed #3 value in condition 344, the CPU moves the transmission back to the second gear slip state 327 and starts with 40 psi in the second gear modulation chart. Otherwise, the CPU in third gear slip state 343 continues to increase the pressure in the third hydraulic clutch 130 until there is zero clutch slip in condition 345. The CPU then sets the pressure in hydraulic clutch 130 to 140 psi and moves into third gear locked state 346. The second gear pressure is also reduced down to 40 psi to provide a quick response to any transmission transitions back to second gear slip state 327.

The transmission system stays in the third gear locked state 346 unless the ERPM falls below the downshift speed #3 value in condition 347. In this case, the transmission system moves back into second gear slip state 327, the pressure in the hydraulic clutch 130 is modulated down to 0 psi, and the CPU starts the second clutch 118 at 40 psi in the second gear modulation chart.

The system described above provides relatively simple transitions between gears without requiring precise synchronized engagement and disengagement of different clutches during gear transitions. Clutches do not have to be fully disengaged during a gear transition therefore partially engaged or disengaged clutches will not create unnecessary heat and reduce the overall efficiency of the transmission system 14. Additional gears and equivalent modulation states could be included in the transmission system 14. The different down shift values, upshift values, gear modulation charts, and psi pressures can vary for different types of vehicles and different types of transmission systems.

Figure 7:
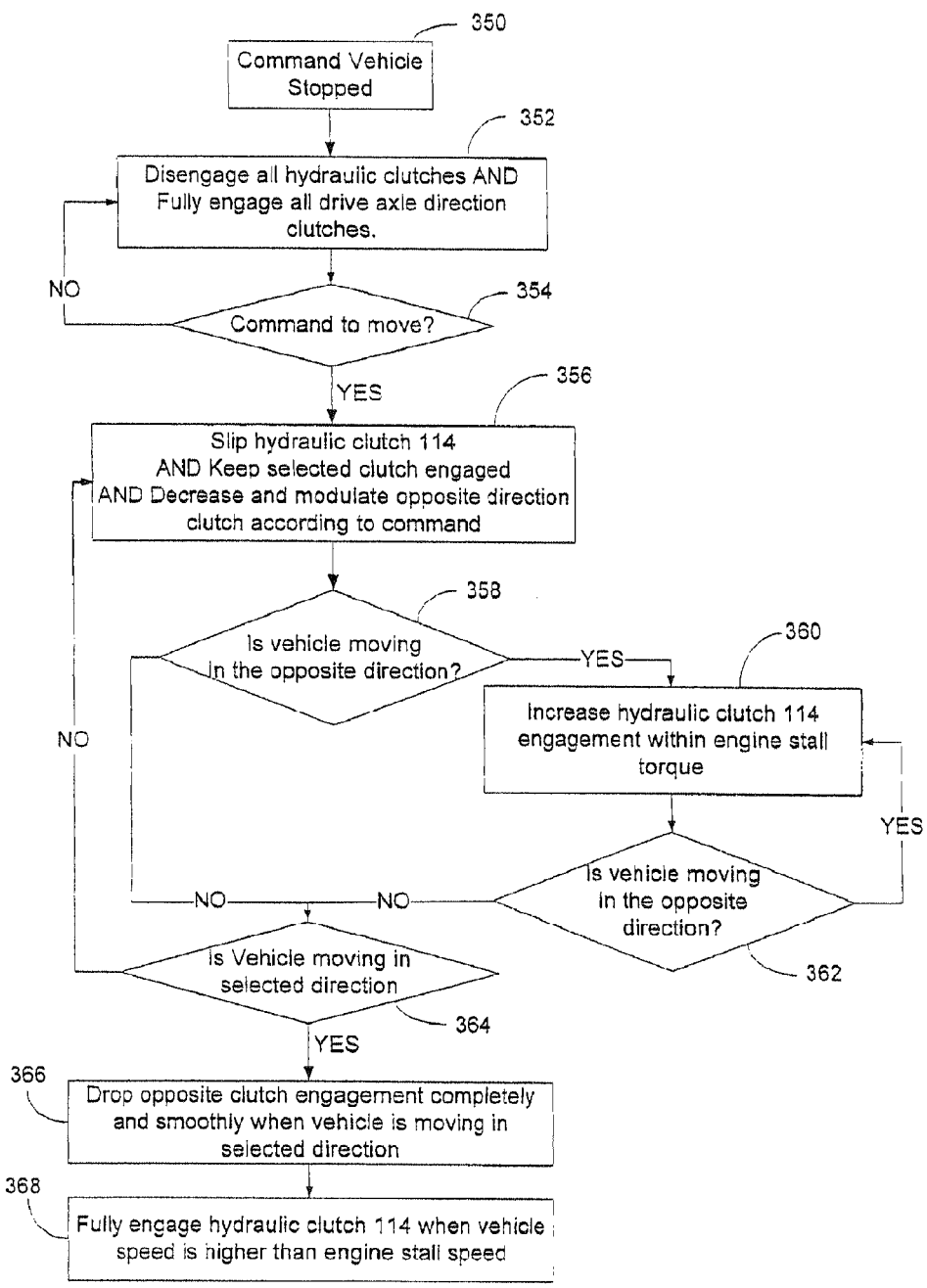
FIG. 7 is a flow diagram showing in more detail how the transmission system in FIG. 1 operates when the vehicle is in a stopped position on a grade.

FIG. 7 is a flow diagram describing in more detail how the CPU 40 controls the hydraulic clutches when the vehicle 10 is located on an inclined grade. As mentioned above, the transmission system 14 can operate with any type of conventional drive axle with directional control. However, in one embodiment the transmission system 14 may operate in conjunction with the clutch system 142 shown in FIG. 1.

A base braking torque is defined in a look up table contained in memory 48 (FIG. 4) as the minimal braking torque. The base braking torque value may be determined by experimenting with the lowest value that prevents the vehicle 10 from rolling on a grade with a given slope. The purpose of the minimal fixed torque is to stop the vehicle 10 on flat terrain and prevent or limit rolling on a grade.

When the vehicle 10 is stopped in operation 350, the CPU 40 in operation 352 disengages the hydraulic clutches in the transmission system 14 and fully engages all the direction clutches in the clutch system 142 in the drive axle 34. When the vehicle 10 is commanded to move forward or reverse in operation 354, the CPU 40 slips the first hydraulic clutch 114 and keeps the selected clutch engaged in operation 356 and at the same time decreases and modulates the opposing travel direction clutches in the clutch system 142 to a minimal value to prevent the vehicle 10 from jerking in the selected direction.

The vehicle 10 then starts moving. If the vehicle 10 starts moving in the opposite direction in operation 358, the CPU 40 increases the engagement of the first hydraulic clutch 114 in operation 360. If the vehicle 10 continues to move in the opposite direction in operation 362, the CPU 40 further increases engagement of the first hydraulic clutch 114 in operation 360. When the vehicle 10 starts moving in the selected direction and the acceleration pedal position is greater than a threshold value, the CPU 40 fully releases (neutralizes) the opposing direction clutch(es) in clutch system 142 in operation 366. The CPU 40 in operation 368 fully engages the first hydraulic clutch 114 when the vehicle speed indicated by speed and direction signal 18 is greater than a calculated engine stall speed.

Thus, control system shown above controls torque to prevent engine stall and clutch damage due to overheating. Torque control is accomplished by slipping the selected direction clutches in the clutch system 142, or in the first hydraulic clutch 114. The clutch pressure is derived from a calculated engine stall torque.

The engine 12 will not be reduced below a minimum speed which maintains enough torque plus a pre-set safety margin to prevent stalling. If the clutch energy exceeds a limit, the torque capacity of the clutch is reduced by reducing clutch pressure or fully disengaging the clutch to prevent damage. Engine speed will be commanded by the CPU 40 to a minimum torque without stalling.

If the clutch energy limit is exceeded, then slipping may alternate between the selected direction clutch(es) in clutch system 142 and the first hydraulic clutch 114, while maintaining a constant transmitted torque. A software clutch energy estimator that monitors clutch heat can be implemented by CPU 40 according to oil temperature, clutch pressure, cooling rate, and slip rate measured via the CPU 40 and the sensors in FIG. 4. When the estimated clutch energy is reduced to an acceptable value, then clutch torque can be increased smoothly within thermal limits to fully re-engage normal driving torque and vehicle performance. During subsequent engine braking, the highest third gear hydraulic clutch 130 can be engaged to connect the engine 12 with output shaft 126.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A vehicle comprising:
 an engine;
 a transmission comprising an input shaft operably connected to the engine for receiving torque, and an output shaft operably connected to a drive axle for transferring the torque to the drive axle;
 a drive gear connected to either the input shaft or to the output shaft for rotation therewith;

a driven gear connected to the other of the input shaft or the output shaft for selective rotation therewith via operation of a first clutch such that the driven gear engages the drive gear; and a processor configured to operate the first clutch to modulate transmission of the torque from the input shaft to the output shaft;

wherein the drive axle comprises a first clutch system operably connected to a first drive wheel; and wherein the processor is further configured to operate a second clutch of the first clutch system to modulate transmission of the torque to rotate the drive wheel in a first rotational direction, and to operate a third clutch of the first clutch system to modulate transmission of the torque to rotate the drive wheel in a second rotational direction that is opposite the first rotational direction.

2. A vehicle according to claim 1, wherein the output shaft is configured to rotate in a single direction.

3. A vehicle according to claim 1, wherein the input shaft is directly connected to the engine without a torque converter interposed between the transmission and the engine.

4. A vehicle according to claim 1, wherein the processor is further configured to operate the first clutch to inhibit transmission of the torque from the input shaft to the output shaft while operating the second clutch and the third clutch to brake the drive wheel.

5. A vehicle according to claim 4, wherein, in response to an input indicating that the vehicle should move from a stop in either a selected forward or a selected reverse direction, the processor is further configured to operate the first clutch to modulate transmission of the torque from the input shaft to the output shaft while operating the second clutch and the third clutch to modulate transmission of the torque to the drive wheel such that the vehicle moves in the selected forward or reverse direction.

6. A vehicle according to claim 1, wherein the processor is further configured to slip the second clutch and the third clutch such that torque resistance at the drive wheel does not stall the engine.

7. A vehicle according to claim 6, wherein the processor is further configured to slip the first clutch such that torque resistance at the drive wheel does not stall the engine; and wherein the processor is further configured to alternate between slipping the first clutch and the clutch system of the drive axle such that a clutch energy limit is not exceeded by any one of the first, second, or third clutch while torque is transmitted to the drive wheel.

8. A method of operating a vehicle comprising:

receiving a vehicle stop command at a processor;

via the processor, disengaging clutches located in a transmission such that engine torque is not transmitted to a drive axle in response to receiving the vehicle stop command; and via the processor, engaging clutches located in a drive axle assembly such that a wheel connected to the drive axle is inhibited from rolling in response to receiving the vehicle stop command.

9. A method of operating a vehicle according to claim 8, further comprising:

receiving a command to move the stopped vehicle in a forward direction at the processor;

via the processor, slipping one clutch located in the transmission such that engine torque is transmitted to the drive axle in response to receiving the command to move the stopped vehicle forward;

via the processor, retaining a clutch located in the drive axle assembly associated with the forward direction engaged in response to receiving the command to move the stopped vehicle forward; and via the processor, slipping a clutch located in the drive axle assembly associated with a rearward direction such that the vehicle moves in the forward direction without stalling an engine in response to receiving the command to move the stopped vehicle forward.

10. A method of operating a vehicle according to claim 8, further comprising:

receiving a command to move the stopped vehicle in a rearward direction at the processor;

via the processor, slipping one clutch located in the transmission such that engine torque is transmitted to the drive axle in response to receiving the command to move the stopped vehicle rearward;

via the processor, retaining a clutch located in the drive axle assembly associated with the rearward direction engaged in response to receiving the command to move the stopped vehicle rearward; and via the processor, slipping a clutch located in the drive axle assembly associated with a forward direction such that the vehicle moves in the rearward direction without stalling an engine in response to receiving the command to move the stopped vehicle rearward.

* * * * *